Patented Mar. 3, 1942

2,275,032

UNITED STATES PATENT OFFICE 2,275,032

MANUFACTURE OF BASIC MAGNESIUM CARBONATE AND HEAT INSULATION MATERIAL COMPRISING SAME

Harold W. Greider and Roger A. MacArthur, Wyoming, Ohio, assignors to The Philip Carey Manufacturing Company, a corporation of Ohio No Drawing. Application August 16, 1938, Serial No. 225,139

8 Claims. (Cl. 25—156)

This invention relates to the manufacture of basic magnesium carbonate and heat insulation material comprising basic magnesium carbonate. It relates especially to the production of basic magnesium carbonate in a finely-divided, light and bulky state that is particularly adapted for employment in the manufacture of heat insulation materials.

Basic magnesium carbonate is widely used in the manufacture of heat insulation materials. It is believed to have the chemical formula $3MgCO_3.MgO_2H_2.3H_2O$. A heat insulation material that is very widely used at the present time and that contains basic magnesium carbonate is the so-called "85% magnesia" insulation which consists essentially of 85% of basic magnesium carbonate and 15% of asbestos fiber. In such insulations, the basic magnesium carbonate, because of its capacity for existing in the form of extremely finely divided particles which form a bulky and extended mass, affords high resistance to the transfer of heat. In addition to its resistance to heat transfer, the basic magnesium carbonate particles must possess sufficient cohesion or binding power to allow the formation of blocks and slabs therefrom which have sufficient strength for handling and use. While 85% magnesia is mentioned, there are many other types of insulation in which basic magnesium carbonate may be used. Thus it may be combined with a number of known heat insulation materials such as calcium carbonate, diatomaceous earth, colloidal clays, mineral fibers of various types, and the like.

By far the greater proportion of basic magnesium carbonate manufactured is obtained from dolomite by the well-known Pattinson process. In the practice of this method, dolomite rock, which is essentially an equimolecular mixture of calcium carbonate and magnesium carbonate of the approximate chemical formula: $MgCO_3.CaCO_3$, is first calcined, or "burned," in a kiln to convert the carbonate rock into a mixture of calcium oxide and magnesium oxide, essentially of the chemical formula $MgO.CaO$ and called dolomitic lime. This lime is then hydrated with water to form a dilute slurry of calcium and magnesium hydroxides, both substantially insoluble in water. This slurry is then treated by passing through it carbon-dioxide-containing gas until all of the calcium hydroxide has been converted to insoluble calcium carbonate and substantially all of the magnesia is in the form of soluble magnesium bicarbonate of the chemical formula: $Mg(HCO_3)_2$. The carbon dioxide used is ordinarily obtained from the dolomite rock during burning and from the fuel used for the burning. The solid matter is then separated from the mixture of insoluble calcium carbonate and soluble magnesium bicarbonate by filtration or settling, or by combination of these methods of separation. The clarified liquor consists essentially of about a 3 per cent. by weight solution of magnesium bicarbonate in water. In practice, it is not feasible to make solutions containing more of the bicarbonate, as the carbon dioxide pressure and time which are both necessary for the production of higher concentrations of magnesium bicarbonate, are not economically available. The solution of magnesium bicarbonate is then heated rapidly, or "boiled," at temperatures usually above 200° F., whereupon insoluble basic magnesium carbonate is precipitated. The basic carbonate is then in condition for incorporation into heat insulating materials.

For example, the suspension from the "boiling" operation, consisting essentially of about a 2 per cent. by weight suspension of basic magnesium carbonate in water, may be settled and filtered until the suspension is a thick paste. The amount of solid matter therein may be determined, for example, by titration with acid, and sufficient asbestos fiber or other ingredients may be added to produce the mixture desired, and the paste may then be formed by filtering under pressure of conveniently 10 to 50 pounds per square inch in filter molds of desired shape, the excess water being expelled from the filter molds. The compacted and molded mixture may then be removed from the mold and dried and trimmed to the shape desired.

In the practice of this process, there are several disadvantages due to the large amount of water necessary for solution of the magnesium carbonate as bicarbonate. Large tanks and filter presses are necessary to prepare the bicarbonate solution. Also, a great amount of heat is necessary to "boil" the dilute solution of magnesium bicarbonate in precipitating the basic magnesium carbonate. Large settling and filtering tanks are also essential to bring the basic carbonate to the proper consistency for subsequent use.

Basic magnesium carbonate may also be made by heating normal magnesium carbonate. Normal magnesium carbonate may be prepared by several methods known to the art, and furthermore, may be prepared in high concentration in water suspension. For example, normal magnesium carbonate may be readily prepared by introducing carbon dioxide into a suspension of magnesium hydroxide at a temperature between about 80° F. and about 158° F. The magnesium carbonate thus produced has the formula $MgCO_3.3H_2O$. While there are believed to be other normal magnesium carbonates containing other amounts of combined water, it is to be understood that reference herein to normal magnesium carbonate includes any normal hydrated magnesium carbonate analogous in the respects herein mentioned to the normal magnesium carbonate produced by treating magnesium hydroxide with carbon dioxide in the manner abovementioned. Basic magnesium carbonate of sufficiently low density and of satisfactory fineness of particle size for manufacture of heat insulating materials cannot, however, be made by heating suspensions of normal magnesium carbonate in water. Further, the basic magnesium carbonate made by "boiling" suspensions of normal magnesium carbonate in water has very poor bonding power and heat insulating blocks or shapes made therefrom have insufficient strength as well as unsatisfactorily high density.

We have now made the unexpected discovery that basic carbonate of magnesia of low density and of fineness of particle size suitable for use in heat insulation material may be obtained by heating normal magnesium carbonate in water in the presence of basic magnesium carbonate produced by heating a magnesium bicarbonate solution. In the preferred application of this discovery it has been found that the rate of production of a plant designed for utilization of dolomite for the manufacture of basic carbonate of magnesia may be increased as much as 100 per cent. or more with virtually no additional equipment or capital cost and with resulting economy immediately apparent to those acquainted with the art.

In one preferred application of this invention, normal magnesium carbonate, produced by treating magnesium oxide or hydroxide with carbon dioxide gas, is mixed with magnesium bicarbonate solution and the mixture is rapidly heated to produce a slurry of basic magnesium carbonate containing considerably more solid matter than could be obtained from the same amount (volume) of 3 per cent. magnesium bicarbonate solution, and the heat necessary for boiling the liquid per pound of basic carbonate produced is correspondingly less. Nearly half of the carbon dioxide gas produced in the burning of dolomitic lime and subsequently used in the above described Pattinson process for the manufacture of basic magnesium carbonate is not necessary for the process and is commonly allowed to escape to the atmosphere. This excess gas is available for reaction with magnesium oxide or hydroxide in producing normal magnesium carbonate in aqueous suspension. This preferred method of carrying out our invention is made clear by the following description illustrating one way of practising this invention, but it is to be understood that we are not to be limited as to the source of either our normal magnesium carbonate or our magnesium bicarbonate. It is desirable that the normal magnesium carbonate crystals be as fine as possible and the conditions recited in the following example are adjusted to form this material in such condition.

Eight pounds of magnesium oxide produced by calcining magnesite ($MgCO_3$) at about 1800° F. for three hours was suspended in thirty gallons of water at about 80° F. and was treated with carbon dioxide gas under 50 lb. pressure per square inch for about one and one-half hours. At this time the suspension consisted of normal magnesium carbonate crystals and a small amount of magnesium bicarbonate in solution. The suspension was then mixed with five times its volume (i. e., with 150 gallons) of magnesium bicarbonate liquor containing 2.9 per cent. of magnesium bicarbonate by weight, obtained from dolomite as described hereinabove with reference to the Pattinson process. The mixture was then boiled at 210° F. by being passed through a boiler adapted to heat the mixture rapidly and to operate in a continuous manner. The resulting slurry was thickened by de-watering and was mixed with an amount of asbestos fiber suitable for the manufacture of 85% magnesia insulation and was molded at about 30 lb. per square inch in a filter mold to form a block which was subsequently removed from the mold and dried. The dried block had a density of 15.7 lb. per cubic foot and possessed properties, including such properties as strength, toughness and high heat insulating efficiency, which made it highly desirable for commercial use as heat insulation.

The advantages to be obtained by the process outlined are immediately obvious. The basic magnesium carbonate obtained from the calcined magnesite in the above example was about 18½ pounds. The basic carbonate obtained from the bicarbonate solution was about 22½ pounds. The water heated to boiling to produce a total of 41 pounds of basic carbonate was 180 gallons. If all the basic carbonate had been produced from bicarbonate solution, it would have been necessary to heat 273 gallons of water to boiling. The saving in heat, which is a costly factor in this process, and in plant capacity per pound of basic carbonate produced was about 34 per cent or conversely stated, the production capacity and heat efficiency of a plant of stated size were increased about 50%. Also, the carbon dioxide necessary to transform the magnesium oxide to normal carbonate is available from the excess gas produced from the burning of the dolomite. When about one-third of the basic carbonate is produced from normal magnesium carbonate and about two-thirds from bicarbonate solution, the capacity of the plant may be increased by an amount approaching 50 per cent maximum as the water content of the normal carbonate slurry is decreased, and the heat required per pound of basic carbonate produced is correspondingly less than if all the product were made entirely from bicarbonate liquor. Similarly, by increasing the amount of basic carbonate produced from normal magnesium carbonate to about 50% of the total, the capacity of the plant can be increased by an amount approaching 100 per cent, with the production of a heat insulation such as 85% magnesia having adequate strength and toughness for commercial use as a heat insulation.

In the practice of this invention as described above and as described hereinbelow in connection with alternate methods of practising this invention, the amount of basic magnesium carbonate produced from the normal carbonate, on the one hand, and from the bicarbonate, on the other hand, may vary within wide limits. Ordinarily we prefer to produce about one-third to one-half of the basic carbonate from the normal magnesium carbonate and two-thirds to one-half of the basic magnesium carbonate from the bicarbonate solution. When about two-thirds of the basic carbonate of magnesia is produced from normal magnesium carbonate and about one-third is produced by boiling magnesium bicarbonate, insulation prepared from the resulting basic magnesium carbonate is somewhat more brittle than when the amount of basic carbonate produced from the normal carbonate of magnesia is approximately half or less. However, even when larger amounts of the basic carbonate are produced by decomposition of the normal carbonate in the presence of basic magnesium carbonate produced by boiling a magnesium bicarbonate solution, the basic carbonate has very considerably greater toughness and effective heat insulation properties when incorporated in a heat insulation material, e. g., 85% magnesia insulation, than if the basic carbonate were prepared entirely by decomposition of the normal carbonate.

In precipitating the basic carbonate from the bicarbonate solution containing normal magnesium carbonate, the mixed materials are preferably heated rapidly to above 190° F., best results being obtained when the mixture is heated at about 200° F. to about 210° F.

While it is preferable to convert normal magnesium carbonate into basic magnesium carbonate in the presence of and simultaneously with the production of basic magnesium carbonate produced by heating a bicarbonate solution by mixing normal magnesium carbonate with magnesium bicarbonate solution and converting the bicarbonate and normal carbonate into basic carbonate substantially simultaneously as described above, it is also possible to first produce basic magnesium carbonate from bicarbonate solution and thereafter in the presence of the basic carbonate thus produced form basic magnesium carbonate from normal carbonate. Thus in another modification of our invention we prepare a slurry of basic magnesium carbonate by heating a magnesium bicarbonate solution preferably to above 190° F. (best results being obtained when the temperature is about 200° F. to about 210° F.). The heating should preferably be as rapid as possible. To this slurry we add normal magnesium carbonate crystals in suspension, and we either continue to heat the suspension to the degree above-mentioned until the normal carbonate is changed to basic carbonate, or we allow the decomposition of the normal carbonate to proceed, utilizing the heat in the boiled slurry. The mixture is then concentrated by de-watering and is adaptable to the production of heat insulation or other products. Alternatively, the de-watering may take place prior to the incorporation of the normal carbonate. The decomposition of the normal carbonate may take place with or without agitation of the mass.

In a third embodiment of our invention we boil a magnesium bicarbonate solution in the manner above described and produce a slurry of basic carbonate which we concentrate by filtering or settling, or both. To this slurry we add a suspension or slurry of normal magnesium carbonate. We may then add to this mixture other ingredients of a heat insulation, e. g., asbestos fibers, and make a molded insulation from the aqueous mixture by molding the insulation in a filter mold. Heat applied while the material is in the mold or after removal of the molded material from the mold and while the material is still moist, i. e., prior to or during drying, but before complete drying, converts the normal carbonate into basic carbonate. The heat that is applied may vary within wide limits between the minimum temperature necessary to decompose normal magnesium carbonate into basic carbonate (about 158° F. at atmospheric pressure) and the temperature at which basic magnesium carbonate is excessively decomposed, i. e., about 550° F. Preferably the heat that is applied is sufficient to subject the mass to a temperature of about 175° F. to about 350° F. An advantage of this method is that the normal magnesium carbonate added to the basic carbonate prior to the forming of, for example, blocks of 85 per cent. magnesia heat insulation, inhibits drying shrinkage. This is of great practical importance. For example, if a slurry of 50 per cent. by weight on a dry basis of normal carbonate and 50 per cent. by weight of basic carbonate produced by boiling magnesium bicarbonate liquor is mixed with 15 per cent. of its weight on the dry basis of asbestos fiber and is molded at, for example, 5 to 10 lb. per square inch pressure, and dried, it will be found that there is substantially no drying shrinkage of the molded articles. Furthermore, the molded articles are sufficiently rigid after a few hours at drying temperatures (about 175° F. to 350° F.) that no expensive shape-retaining supports are needed during the subsequent drying in spite of the fact that the molded articles are still quite wet. Also, trimming scrap is reduced, as the articles can be molded much nearer in dimension to the trimmed final shape. In the manufacture of 85% magnesia insulation the amount of trimming scrap is frequently as high as 30% and this trimming scrap can be very largely and almost entirely eliminated in the practice of this invention. Moreover, by causing the normal magnesium carbonate to decompose in the presence of basic magnesium carbonate after a heat insulating material comprising these sustances has been molded, the resulting heat insulation can be made lighter and at the same time of increased strength as compared with a heat insulation material similarly prepared but comprising a like amount of basic magnesium carbonate all of which is produced prior to molding.

In still another desirable modification of the invention, we form normal magnesium carbonate by addition of magnesium oxide or hydroxide to magnesium bicarbonate solution (instead of producing the normal carbonate in a separate operation) and then heat the mixture rapidly. In the preferred practice of this method, a slurry of active magnesium oxide or hydroxide is introduced into magnesium bicarbonate solution. The mixture is agitated more or less to hold the solids in suspension until the added magnesium compound has been substantially completely converted to normal carbonate. It is preferable in this case that the added magnesium as oxide or hydroxide be no more than enough to form about one-third of the basic carbonate produced by the subsequent boiling. If the amount of magnesium oxide or hydroxide that is added exceeds that mentioned above, carbon dioxide can be passed through the aqueous mixture to increase the relative proportion of the bicarbonate therein. However, the relative amounts of basic carbonate produced from the normal carbonate (in this instance as formed from magnesium hydroxide or oxide) and from the bicarbonate solution may vary within relatively wide limits as has been mentioned hereinabove.

While we have no theory to offer to explain the superior results to be obtained by heating normal magnesium carbonate in the presence of basic carbonate produced by boiling magnesium bicarbonate solutions, it is readily apparent that the presence of the latter material is essential, whether the latter material is produced first or is produced simultaneously with the production of basic magnesium carbonate from normal magnesium carbonate and whether the basic magnesium carbonate is produced from the normal magnesium carbonate before or after the mixed materials are molded. It is readily possible to produce a light heat insulation material from normal magnesium carbonate alone mixed with asbestos fiber providing the normal carbonate is produced under very carefully controlled conditions and further providing that little or no pressure is used when the shape is molded. We have found, however, that such magnesia insulation is exceedingly brittle and does not have a smooth and tough texture. If such insulation is pressure molded it becomes excessively heavy and of poor insulating value and is excessively brittle. In the practice of our invention, it is possible to obtain exceedingly tough and strong insulating blocks and shapes which at the same time are light and bulky and have high insulation efficiency. Furthermore, in the practice of our invention, it is possible to utilize crystals of normal magnesium carbonate too large to produce directly anything but excessively heavy insulating materials.

While we have specified above magnesium bicarbonate produced from dolomite and normal magnesium carbonate produced from magnesite, we do not limit ourselves to these sources. Normal magnesium carbonate may be produced from several sources. For example, magnesium salts from sea water or salt-well bitterns may be converted to magnesium hydroxide by well-known methods; and this hydroxide may be converted to normal magnesium carbonate by treatment with carbon dioxide gas. Alternatively, magnesium salts may be changed to normal carbonate by reaction with soluble carbonates. The magnesium bicarbonate solution also may be made from magnesium compounds by methods known to the art. When, for example, the source of all the magnesia is magnesium hydroxide from sea water or from magnesite, the normal carbonate and bicarbonate solution may both be made from this material. When the source of all the magnesia is dolomite, the normal carbonate and bicarbonate solution may both be made from this material as described in our application Serial No. 225,140, filed August 16, 1938. In general, the location of the plant will determine the source of the magnesia, and the source producing the cheapest basic carbonate will be most desirable.

It is to be noted, also, that where carbon dioxide gas is used, it may be that from any source, either substantially pure or greatly diluted, as it is well known to the art that the concentration is variable in practice.

We claim:

1. In the preparation of basic magnesium carbonate from a mixture of magnesium and calcium hydroxides wherein the said hydroxides are treated with carbon dioxide to convert them to precipitated calcium carbonate and dissolved magnesium bicarbonate, the dissolved magnesium bicarbonate is separated from the precipitated calcium carbonate, and the dissolved magnesium bicarbonate is converted into basic magnesium carbonate by rapidly heating said solution, the steps comprising adding a suspension of normal magnesium carbonate particles to the solution of magnesium bicarbonate and converting the particles of normal magnesium carbonate and the dissolved magnesium bicarbonate in the mixture into basic magnesium carbonate by rapidly heating the mixture.

2. A method of making basic magnesium carbonate which comprises heating a solution of magnesium bicarbonate to convert said magnesium bicarbonate into basic magnesium carbonate and then heating finely-divided normal magnesium carbonate commingled with said basic magnesium carbonate thus formed to convert said normal magnesium carbonate into additional basic magnesium carbonate, not more than about 2/3 of the total basic magnesium carbonate being produced from the said normal magnesium carbonate.

3. A method according to claim 2 of making basic magnesium carbonate wherein the mixture of basic magnesium carbonate and normal magnesium carbonate is subjected to agitation during the conversion of the normal magnesium carbonate into basic magnesium carbonate.

4. A method of making basic magnesium carbonate which comprises rapidly heating a solution of magnesium bicarbonate to at least about 190° F. to convert said magnesium bicarbonate into basic magnesium carbonate, mixing finely-divided normal magnesium carbonate with the basic magnesium carbonate thus produced and converting said normal magnesium carbonate in the mixture into additional basic magnesium carbonate by rapidly heating the mixture to at least about 190° F., not more than about 50% of the total basic magnesium carbonate being produced from said normal magnesium carbonate.

5. In a method making heat insulation material wherein a semi-fluid mass comprising basic magnesium carbonate and water is molded and the molded product is dried, the steps comprising preparing basic magnesium carbonate by rapidly heating a solution of magnesium bicarbonate, making a semi-fluid mass containing the basic magnesium carbonate thus prepared and containing finely-divided normal magnesium carbonate incorporated with said basic magnesium carbonate, molding the mass, and heating the molded mass prior to complete drying thereof sufficiently to convert normal magnesium carbonate contained therein into basic magnesium carbonate.

6. In a method of making heat insulation material wherein a semi-fluid mass comprising basic magnesium carbonate is molded and the molded product is dried, the steps comprising preparing basic magnesium carbonate by rapidly heating a water solution of magnesium bicarbonate to at least about 190° F., making a semi-fluid mass containing the basic magnesium carbonate thus prepared and containing finely-divided normal magnesium carbonate incorporated with said basic magnesium carbonate, molding the mass, and heating the molded mass prior to complete drying thereof sufficiently to convert normal magnesium carbonate contained therein into basic magnesium carbonate, not more than about 2/3 of the total basic magnesium carbonate in the insulation being produced from said normal magnesium carbonate.

7. In the preparation of basic magnesium carbonate from a mixture of magnesium and calcium hydroxides wherein the said hydroxides are treated with carbon dioxide to convert them to precipitated calcium carbonate and dissolved magnesium bicarbonate, the dissolved magnesium bicarbonate is separated from the precipitated calcium carbonate, and the dissolved magnesium bicarbonate is converted into basic magnesium carbonate by rapidly heating said solution, the steps comprising incorporating with the bicarbonate solution a suspension of magnesium hydroxide particles adapted to react with magnesium bicarbonate to form particles of normal magnesium carbonate, the proportions in the mixture being controlled so that at least about 50% of the magnesia occurs as magnesium bicarbonate, and converting the particles of normal magnesium carbonate and the dissolved magnesium bicarbonate in the mixture into basic magnesium carbonate by rapidly heating the mixture.

8. A molded heat insulation material consisting predominantly of basic magnesium carbonate and made by molding a semi-fluid mass comprising normal magnesium carbonate in admixture with basic magnesium carbonate produced by precipitation from magnesium bicarbonate solution, the said basic magnesium carbonate being at least about one-third of the total mixture, and heating the molded mass to decompose the normal magnesium carbonate in the molded mass to basic magnesium carbonate whereby the basic magnesium carbonate produced by heating the molded mass acts as a bond for the basic magnesium carbonate produced by precipitation from magnesium bicarbonate solution.

HAROLD W. GREIDER.
ROGER A. MacARTHUR.